(12) United States Patent
Mata Dumenjó et al.

(10) Patent No.: US 8,912,675 B2
(45) Date of Patent: Dec. 16, 2014

(54) REACTIVE POWER REGULATION

(75) Inventors: Montserrat Mata Dumenjó, Barcelona (ES); Jordi Carulla Piera, Barcelona (ES); Oriol Gomis Bellmunt, Barcelona (ES)

(73) Assignee: Alstom Wind, S.L.U., Barcelona (ES)

( * ) Notice: Subject to any disclaimer, the term of this patent is extended or adjusted under 35 U.S.C. 154(b) by 0 days.

(21) Appl. No.: 13/813,413

(22) PCT Filed: Aug. 2, 2010
(Under 37 CFR 1.47)

(86) PCT No.: PCT/EP2010/061233
§ 371 (c)(1),
(2), (4) Date: Jan. 30, 2013

(87) PCT Pub. No.: WO2012/016585
PCT Pub. Date: Feb. 9, 2012

(65) Prior Publication Data
US 2014/0062086 A1    Mar. 6, 2014

(51) Int. Cl.
| | |
|---|---|
| F03D 9/00 | (2006.01) |
| H02J 3/50 | (2006.01) |
| F03D 7/04 | (2006.01) |
| F03D 7/02 | (2006.01) |
| F03D 7/00 | (2006.01) |
| H02J 3/18 | (2006.01) |
| H02J 3/38 | (2006.01) |

(52) U.S. Cl.
CPC ............. *F03D 7/00* (2013.01); *Y02E 10/763* (2013.01); *F03D 9/005* (2013.01); *H02J 3/50* (2013.01); *F03D 7/048* (2013.01); *F03D 7/0284* (2013.01); *Y02E 40/22* (2013.01); *H02J 3/1892* (2013.01); *H02J 3/1842* (2013.01); *H02J 3/386* (2013.01); *Y02E 10/723* (2013.01)
USPC ........................ 290/44; 290/7; 290/34

(58) Field of Classification Search
USPC ................. 290/44, 55; 322/44; 700/286–291
See application file for complete search history.

(56) References Cited

U.S. PATENT DOCUMENTS

| | | | |
|---|---|---|---|
| 6,181,099 B1 * | 1/2001 | Bixel et al. ................... 318/610 |
| 7,025,567 B2 * | 4/2006 | Wobben ............................ 416/1 |
| 7,298,059 B2 * | 11/2007 | Delmerico et al. ............. 307/85 |
| 7,342,323 B2 * | 3/2008 | Avagliano et al. ............. 290/55 |
| 7,531,911 B2 | 5/2009 | Rivas et al. |
| 8,025,476 B2 * | 9/2011 | Zheng et al. ..................... 415/1 |
| 2004/0199343 A1 * | 10/2004 | Cardinal et al. ................ 702/63 |
| 2007/0228838 A1 * | 10/2007 | Delmerico et al. ............. 307/84 |

(Continued)

FOREIGN PATENT DOCUMENTS

| | | |
|---|---|---|
| EP | 1 850 002 | 10/2007 |
| WO | WO 2005/099063 | 10/2005 |
| WO | WO 2009/083446 | 7/2009 |
| WO | WO 2009083446 A2 * | 7/2009 |

*Primary Examiner* — Tulsidas C Patel
*Assistant Examiner* — Charles Reid, Jr.
(74) *Attorney, Agent, or Firm* — Squire Patton Boggs (US) LLP

(57) ABSTRACT

The present invention relates to a method of reactive power regulation in a wind turbine comprising a local reactive power control system adapted to operate in a central control mode and a local control mode, a method of reactive power regulation in a wind park connected to an electrical grid, and to a wind park.

29 Claims, 4 Drawing Sheets

(56) References Cited

U.S. PATENT DOCUMENTS

| | | |
|---|---|---|
| 2008/0073912 A1 | 3/2008 | Fortmann et al. |
| 2008/0106099 A1 | 5/2008 | Ichinose et al. |
| 2009/0177333 A1* | 7/2009 | Delmerico et al. ........... 700/297 |
| 2009/0218817 A1* | 9/2009 | Cardinal et al. ................ 290/44 |
| 2009/0218818 A1* | 9/2009 | Cardinal et al. ................ 290/44 |
| 2010/0025994 A1* | 2/2010 | Cardinal et al. ................ 290/44 |
| 2010/0134076 A1* | 6/2010 | Cardinal et al. .............. 323/207 |

* cited by examiner

REACTIVE POWER REGULATION

The present invention relates to a method for reactive power regulation in a wind park, a method of reactive power regulation in a wind turbine and to a wind park.

BACKGROUND ART

With the increased use of wind energy for electricity generation, grid operators (TSO's or Transmission System Operators) have introduced stricter requirements for wind park operators with respect to active and reactive power generation in support of the grid. For example, wind park operators may be requested to not always generate maximum active power available depending on wind conditions. Also, in accordance with some grid codes, wind parks have to support the grid during a voltage drop and not e.g. disconnect from the grid.

In this respect, it is known to vary the reactive power generated in a wind park in accordance with a grid voltage at a Point of Common Coupling (PCC). It is also known to vary the active power generated in a wind park in accordance with a measured grid frequency.

EP 1 850 002 discloses a wind park comprising a number of fixed speed wind turbines and a number of variable speed wind turbines. The variable speed wind turbines are adapted to equalize an output of the wind park by compensating for a varying output of the fixed speed wind turbines. These variable speed wind turbines may be independent or a central management device may be provided for sending control commands to each of the variable speed wind turbines.

U.S. Pat. No. 7,531,911 discloses a method of reactive power regulation in a wind farm wherein a measured reactive power output of the wind farm is compared to a reactive power set point; based on the difference between them, a reactive power command is generated. The reactive power commands for each of the wind turbines are determined as a percentage of an instantaneous maximum reactive power capacity of each of the turbines.

US 2008/0073912 discloses a wind park including at least two wind turbines and a park master configured for power factor control and for sending global power coefficient signals to lower level regulators at the wind turbines.

In general, prior art control systems are known that are based either on a centralised control or on a decentralised control. An advantage of a centralised control approach may generally be that the control is stable. However a disadvantage of a centralised control may be that such a control is not always able to react sufficiently quickly to grid abnormalities. An advantage of a decentralised control may be that it is quicker to react to grid abnormalities, but a disadvantage can be that the control can be unstable.

There thus still exists a need for a power control in a wind farm that can combine stable control with quick reaction capability to grid abnormalities.

The present invention is aimed at partially or completely fulfilling this need. Further advantages will become apparent from the description that follows.

SUMMARY OF THE INVENTION

In a first aspect, the present invention provides a method of reactive power regulation in a wind park connected to an electrical grid, the wind park comprising a plurality of wind turbines and a central reactive power control system, wherein at least a first portion of the plurality of wind turbines comprises a local reactive power control system adapted to work in a central control mode and a local control mode, wherein the central reactive power control system sends commands indicative of local reactive power demands to the local reactive power control systems in accordance with at least one measured variable of the grid; and wherein in a central control mode, a local reactive power control system operates a wind turbine to generate reactive power in accordance with said commands; and wherein in a local control mode, a local reactive power control system determines an amount of reactive power to be generated and controls a wind turbine to generate said amount of reactive power.

In accordance with this aspect of the invention, a combination of centralised control and decentralised control is provided, combining the advantages of both approaches.

In some embodiments, a local reactive power control system may switch from the central control mode to the local control mode when a measured local variable passes a local limit value for the wind turbine. An exceptional grid condition will generally be translated in an exceptional grid condition within the wind park. An aspect of these embodiments is that a local control system does not have to wait for a central control system to detect an abnormality and translate that abnormality into control signals. Instead a local control system is able to measure the abnormality and quickly respond. Optionally, the switch to a local control made is only made if the measured local variable passes a local limit value during at least a predetermined period of time. Preferably, the local limit values for each wind turbine are determined substantially such that in normal grid conditions, the wind park operates in the central control mode and that in or near exceptional grid conditions, the wind park operates in the local control mode. An aspect of these embodiments is that in normal grid conditions, the more stable centralised control may be used, whereas in or near exceptional grid conditions, a quicker response with the local control is available. According to these embodiments, in exceptional grid conditions, all wind turbines with local reactive power control systems may be in local control mode or only a part of them. A TSO may determine what "normal" grid conditions are. Any grid condition that is not considered "normal" may be considered "exceptional". An example of an exceptional grid condition may be e.g. a grid voltage outside predefined boundary values.

In some embodiments, the local limit values for each wind turbine are voltages and said measured local variables are local voltages. In some of these embodiments, local limit values for each wind turbine comprise a minimum and a maximum voltage.

In some embodiments, the local limit values may be constant. In alternative embodiments, local limit values may be determined in accordance with at least one measured variable.

In some embodiments, the amount of reactive power generated in a local control mode may be the maximum or minimum amount of reactive power a wind turbine can actually generate. In some embodiments, the local control systems may determine the maximum and minimum amount of reactive power a wind turbine can generate in accordance with operational conditions of the wind park and/or each wind turbine. Conditions that may be taken into account include e.g. thermal conditions of components of the generator and/or converter. Alternatively, the local control systems may use predefined maximum and/or minimums (which will have to be within actual operational limits of the generator and/or converter).

In some embodiments, a local reactive power control system may switch from the central control mode to the local control mode when an absolute value of a rate of change of a measured local variable (e.g. a local voltage) surpasses a local limit rate. In these embodiments, the local control mode may be activated when a rate of change (either positive or negative) passes a limit rate. Optionally, the local limit rates may be constant. The local limit rates may also be determined in accordance with at least one measured variable.

In some embodiments, the local reactive control systems switch from the central control mode to the local control mode when a sudden change of a measured local variable surpasses local limit proportions. Optionally, said local limit proportions comprise an absolute local limit difference. In these embodiments, the switch is not necessarily determined by an instantaneous value of a rate of change of a voltage, but rather by a "jump" of a certain size within a certain time. In these embodiments, the rate of change is thus indirectly taken into account.

In some embodiments, when a local control system switches from a central control mode to a local control mode in response to a rate of change of a measured local variable surpassing a local limit rate, in the local control mode, the amount of reactive power to be generated may be determined in accordance with the registered rate of change and/or operational conditions of the wind park and/or operational conditions of the wind turbine.

In some embodiments, when a local control system switches from a central control mode to a local control mode in response to a sudden change of a measured local variable surpassing local limit proportions, in the local control mode, the amount of reactive power to be generated may be determined in accordance with the registered sudden change and/or operational conditions of the wind park and/or operational conditions of the wind turbine.

In some embodiments, the local limit values and/or local limit rates and/or local limit proportions for a sudden change may be calculated periodically (either by a central control system or by the local control systems), or may be provided e.g. by means of a pre-calculated look-up-table. The local limit values and/or local limit rates and/or local limit proportions may also be determined in accordance with an algorithm obtained with an artificial neural network.

In some embodiments, the local limit values and/or local limit rates and/or local limit proportions for a sudden change of a variable may be determined by the central reactive power control system and supplied to each of the local reactive power control systems. In other embodiments, the local limit values and/or local limit rates and/or local limit proportions may be determined by each of the local reactive power control systems.

In some embodiments, a local reactive power control system may switch from the local control mode to the central control mode after a predetermined amount of time of operating in the local control mode has passed. In other embodiments, a local reactive power control system may switch from the local control mode to the central control mode in accordance with operational conditions of the wind park and/or electrical grid and/or wind turbines.

In some embodiments, in the central control mode a central reactive power demand may be determined in response to a measured grid voltage. Optionally the commands indicative of local reactive power demands may be determined by distributing the central reactive power command between the plurality of wind turbines such that each local power control command represents the same percentage of the maximum available local reactive power of each wind turbine. In alternative embodiments, different distribution algorithms or distribution keys may be used.

In another aspect, the invention provides a method of reactive power regulation in a wind turbine comprising receiving commands indicative of a local reactive power demand from a central reactive power control system; obtaining a maximum and a minimum local voltage; obtaining an instantaneous value of the local voltage from a measuring device and comparing said instantaneous value for the local voltage with the limit values; and if the local voltage is more than the maximum local voltage, sending control commands to at least one wind turbine component for generating the maximum available inductive reactive power; and if the local voltage is less than the minimum local voltage, sending control commands to at least one wind turbine component for generating the maximum available capacitive power. In this aspect, a method of control of a wind turbine is provided that is able to quickly and stably provide support to a grid.

In some embodiments, the method of reactive power regulation in a wind turbine may further comprise obtaining an absolute rate of change limit of a local voltage, determining a rate of change of a local voltage based on the obtained values of the local voltage from the measuring device, and if the absolute determined voltage rate of change is more than the absolute rate of change limit, locally determining the amount of reactive power to be generated, and sending control commands to at least one wind turbine components for generating said amount of reactive power. In these embodiments, wind turbines are not only quick to react to a particularly high or a particularly low voltage on the grid, also voltage changes are taken into account.

Optionally, obtaining an absolute rate of change limit of a local voltage comprises receiving the absolute rate of change limit from the central reactive power control system. Another option is that obtaining an absolute rate of change limit of a local voltage comprises calculating the absolute rate of change limit.

In alternative embodiments, the method further comprises obtaining local limit proportions for a sudden difference in voltage, determining a sudden difference in voltage based on the obtained values of the local values from the measuring device, and if the sudden difference in voltage surpasses the local limit proportions, locally determine the amount of reactive power to be generated, and sending control commands to at least one wind turbine component for generating said mount of reactive power. In these embodiments, wind turbines are able to react quickly to voltage "jumps" (both positive and negative) on the grid.

In a further aspect, the invention also provides a computer program product comprising program instructions for causing a computing system to perform a method of reactive power regulation in a wind turbine substantially as hereinbefore described. Said computer program may be embodied on storing means (for example, on a record medium, on a computer memory or on a read-only memory) or carried on a carrier signal to be, for example, downloaded from a computer or sent by an email (for example, on an electrical or optical carrier signal).

In yet another aspect, the invention provides a wind park connected to an electrical grid and comprising a plurality of wind turbines, wherein at least a portion of the plurality of wind turbines comprises a local reactive power control system capable of controlling the reactive power a wind turbine generates, the wind park further comprising a central reactive power control system capable of determining commands indicative of local reactive power demands for each of the local reactive power control systems in response to at least one measured variable of the grid, and sending the commands to the local reactive power control systems, and the local reactive power control so systems being adapted to work in a central control mode and a local control mode, wherein in a central control mode, the local reactive power control system controls a wind turbine to generate reactive power in accordance with a command received from the central reactive power control system, and wherein in a local control mode, the local reactive power control system determines an amount of reactive power to be generated by the corresponding wind turbine and controls the wind turbine to generate said amount of reactive power.

In some embodiments, the local reactive power controls are adapted to control an converter and/or a pitch system.

In some embodiments, the wind park may comprise additional reactive power compensation means such as e.g. capacitor banks and/or inductor banks, and the central reactive power control may be adapted to control these reactive power compensation means. In these embodiments, the wind park comprises more possibilities to control the generated reactive power.

In yet another aspect, the invention provides a method of reactive power regulation in a wind turbine comprising receiving commands indicative of a local reactive power control system; obtaining an absolute rate of change limit of a local voltage; obtaining instantaneous values of the local voltage from a measuring device; determining a rate of change of a local voltage based on the obtained values of the local voltage from the measuring device, and if the absolute voltage rate of change is less than the rate of change limit, sending control commands to at least one wind turbine component for generating reactive power in accordance with the commands received from the central reactive power control system; and if the absolute determined voltage rate of change is more than the rate of change limit, locally determining the amount of reactive power to be generated, and sending control commands to at least one wind turbine component for generating said amount of reactive power.

And in yet another aspect, the invention provides a method of reactive power regulation in a wind turbine comprising receiving commands indicative of a local reactive power control system; obtaining local limit proportions for a sudden change in local voltage; obtaining instantaneous values of the local voltage from a measuring device; determining a sudden difference in voltage based on the obtained values of the local voltage from the measuring device, and if the sudden change of voltage is less than local limit proportions, sending control commands to at least one wind turbine component for generating reactive power in accordance with the commands received from the central reactive power control system; and if the sudden difference in voltage surpasses the local limit proportions, locally determining the amount of reactive power to be generated, and sending control commands to at least one wind turbine component for generating said amount of reactive power.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS OF THE INVENTION

Throughout the description reference is made to a maximum or minimum amount of reactive power, to a positive or negative amount of reactive power, as well as to an increase or decrease in reactive power. Within the scope of this description, a positive reactive power is considered capacitive reactive power; a maximum amount of reactive power is thus considered to be the so maximum possible capacitive reactive power, and an increase in reactive power is thus considered to be an increase in capacitive power (or a decrease in inductive power). A negative reactive power is considered to be inductive reactive power; a minimum amount of reactive power is thus considered to be the maximum possible inductive reactive power, and a decrease in reactive power is thus considered to be an increase in inductive power (or a decrease in capacitive power).

Figure 1A:
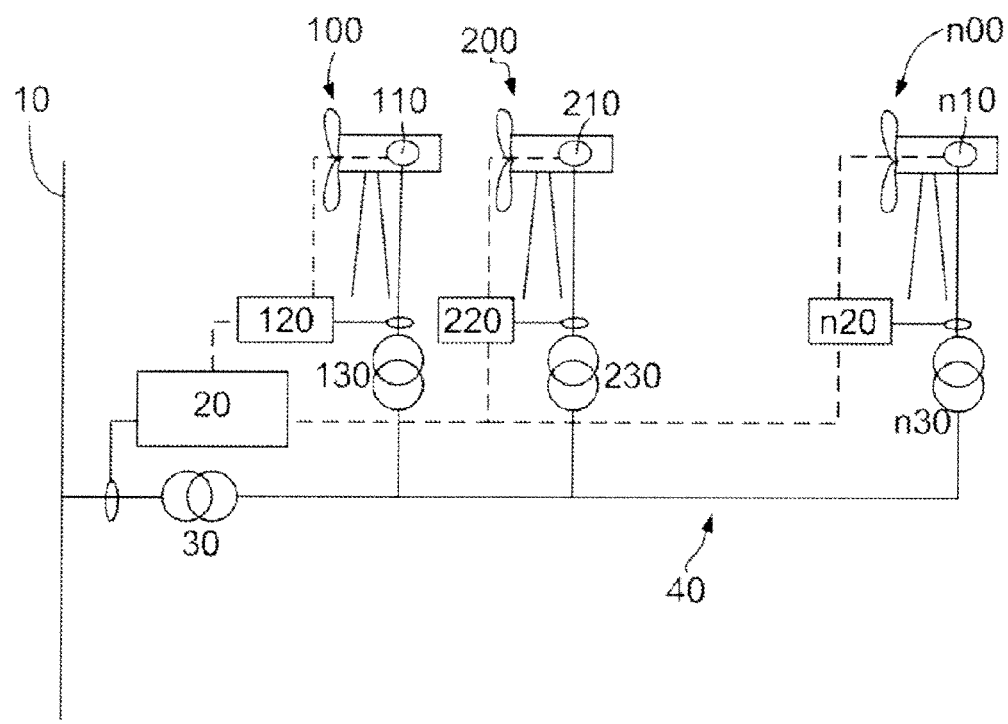
FIG. 1a schematically illustrates a first embodiment of a wind park according to the present invention.

FIG. 1a schematically illustrates a wind park comprising n wind turbines, 100, 200 . . . n00. At least a portion of the n wind turbines comprises a local reactive power control system 120, 220 . . . n20. The reactive local control systems may be incorporated in a larger general local control system or may be a dedicated stand-alone control system. Each of the wind turbines comprises a generator 110, 210 . . . n10.

The wind park further comprises a central reactive power control system 20. Also the central reactive power control system 20 may be part of a general central wind park control system or may be a dedicated stand-alone control system.

The wind park is connected to an electrical grid 10 at a Point of Common Coupling (PCC). Each of the generators of the wind turbines may be connected to the medium voltage wind park grid 40 through a suitable transformer 130, 230 . . . n30. The medium voltage wind park grid 40 may be connected to the High Voltage electrical grid through a suitable transformer 30.

Schematically illustrated with dotted lines are lines of communication between the central reactive power control system 20 with each of the local reactive power control systems 120, 220, . . . n20. Data may thus be interchanged and the central control system 20 may send commands to the local control systems. Each of the local control systems is furthermore able to communicate with its corresponding generator and converter (if present). Data from the generator and converter (currents, voltages) may thus be collected by the local control system and the local control system can give commands to control the wind turbine and at least some of its components.

Figure 1B:
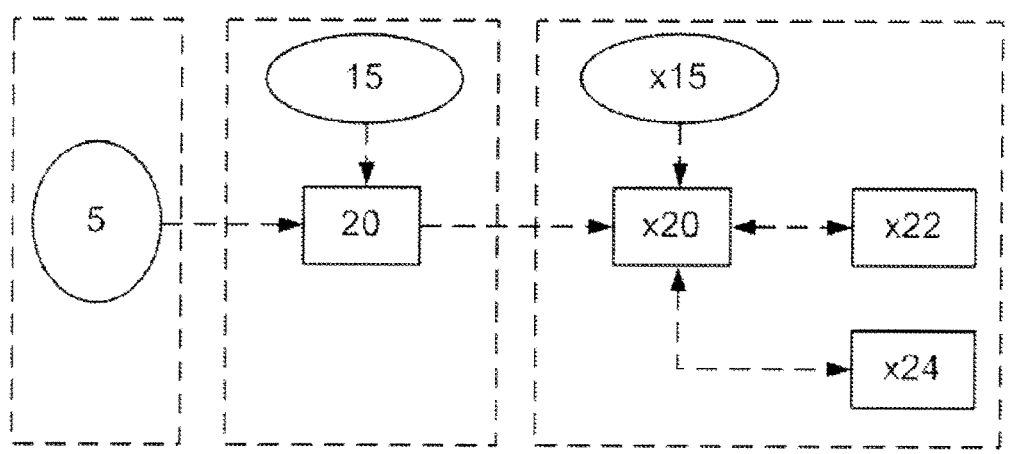
FIG. 1b schematically illustrates communication lines in said first embodiment.

FIG. 1b schematically illustrates communication lines in said first embodiment. A TSO 5 can communicate its requirements to a wind park central reactive power control system 20. The central control system may in accordance with one or more measurements 15 send instructions to a local reactive power control system x20. On the basis of these instructions and on the basis of one or more measurements x15, in this embodiment, the local control system x20 may control a converter control system x22 and a pitch control system x24. The converter control system x22 and pitch control system x24 are able to communicate their functioning to the local control system x20. Controlling both pitch and the converter, the local control system may be able to control e.g. the wind turbine active power, wind turbine speed, the reactive power generation, frequency control, voltage control and LFRT (Line Fault Ride-Through) behaviour.

A measurement 15 upon which the central control 20 may base its instructions may be a grid voltage at or near the PCC. Measurements x15 which may be taken into account by the local controls 120, 220, x20 etc. may be local voltages.

In accordance with embodiments of the invention, in response to a local measured voltage, the control mode of one or more of the local reactive power control systems may be switched from a central control mode (in which the instructions sent to the local control x20 are followed by the local control system) to a local control mode (in which the local control systems determine amounts of reactive power to be generated and control the wind turbines accordingly). In some embodiments and in some circumstances, the amounts of reactive power to be generated may e.g. be a minimum or a maximum amount of reactive power.

Figure 2A:
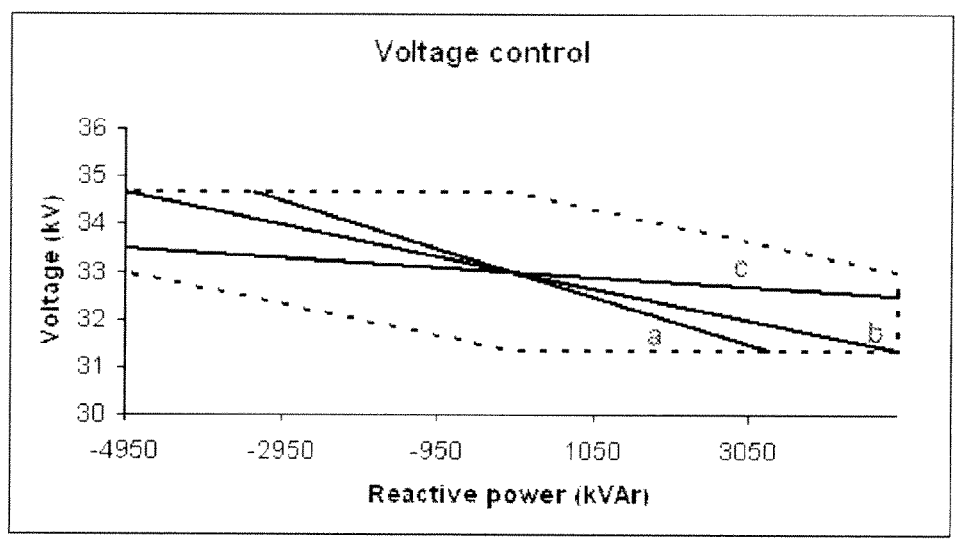
FIGS. 2a-2b illustrate a central reactive power control in accordance with some embodiments of the present invention.

FIG. 2a illustrates one of the requirements that a TSO may give a wind park operator. Within a certain range of grid voltages, the amount of reactive power that a wind park operator may be required to deliver may vary linearly in accordance with one of the lines shown. In FIG. 2a, an example is shown of a wind park of 4950 kVAR and a voltage at the PCC of 33 kV. The TSO may, in accordance with circumstance require a wind park operator to deliver reactive power in accordance with one of the straight lines a, b or c shown. More of such lines may be provided by a TSO. Alternatively, the corresponding values may be provided to a wind park operator in the form of one or more tables specifying how much reactive power is to be generated in response to varying grid conditions.

In general, each of the straight lines a, b and c may be described with the following equation:

$$Q_{WF} = \frac{U_{measured} - U_{ref}}{U_b} \cdot k, \quad \text{Eq. 1}$$

wherein $Q_{WF}$ is a reference reactive power (reactive power to be generated by the wind park), $U_{measured}$ is a measured voltage at the PCC, $U_{ref}$ is a reference voltage at the PCC which may be provided by a TSO, $U_b$ is a voltage (either medium or high voltage) and k is a constant. Both $U_b$ and k may be provided by a TSO. Each of the lines a, b, and c in FIG. 2a represent a line with a different constant k.

In practice, a TSO may require a certain slope for the straight line (a, b or c), usually in the form of a percentage "g". The constant k however will depend on the reactive power capacity of the wind park and may be determined in accordance with:

$$k = \frac{-100 \cdot Q_{max}}{g}, \quad \text{Eq. 2}$$

wherein $Q_{max}$ is the maximum reactive power capacity of the wind park.

When the grid voltage is outside the boundaries shown in FIG. 2a, a wind park operator may be required to generate maximum (capacitive) available reactive power or to generate minimum (inductive) available reactive power. In the particular embodiment shown, when the grid voltage is inside the boundaries (and absent other abnormalities), the grid may be said to be in "normal conditions". When the grid voltage is outside the boundaries, the grid may be said to be in "exceptional conditions". The definition of normal grid conditions and exceptional grid conditions may depend on the grid and on the ISO.

Figure 2B:
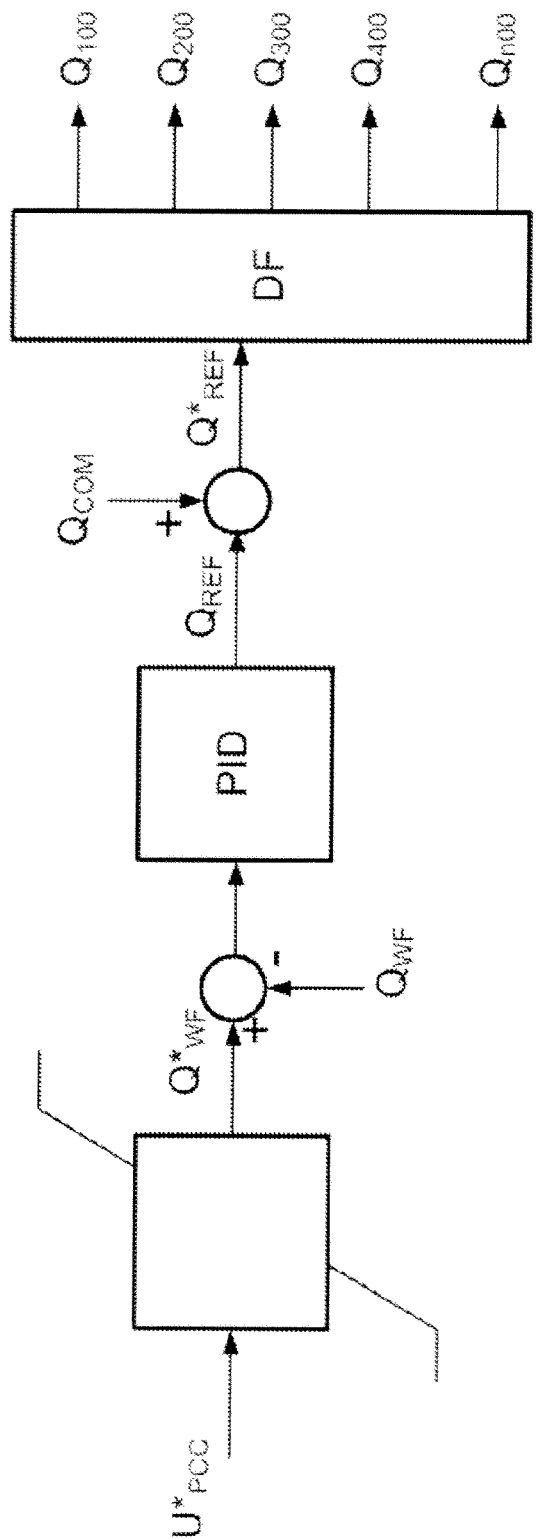

FIG. 2b further illustrates a possible central control method in accordance with some embodiments of the invention. Once an amount of required reactive power $Q^*_{WF}$ has been determined in accordance with the TSO's requirements, this $Q^*_{WF}$ is compared to the amount of reactive power actually generated at that moment $Q_{WF}$. The difference between these two values ("the error") may be input for a PID controller, which generates a central reactive power control command $Q_{ref}$.

For different embodiments of the invention, the values for the constants for the proportional, integral and derivative components may vary, and for some embodiments, some constants may be equal to zero. A PID control is however merely one of the possible control methods that may be employed in a central reactive power control system in embodiments of the invention.

A compensation factor $Q_{com}$ may be added to compensate for the capacitance of the wind park. In some embodiments of the invention, the compensation factor $Q_{com}$ may be determined in accordance with:

$$Q_{com} = \sum_{i=0}^{N} F_i \cdot X_{cci} \cdot I_i^2 + X_{ccwf} \cdot I_{trwf}^2; \quad I_i = \frac{I_{trwf}}{\sum_{i=0}^{N} F_i}, \quad \text{Eq. 3}$$

wherein $F_i$ indicates for each wind turbine whether a particular wind turbine is operative or not (if operative then F=1, if not operative, then F=0) $X_{cci}$ is the reactance of the transformer of a particular wind turbine, $I_i$ is the current in the transformer in a particular wind turbine, $X_{ccwf}$ is the reactance of the wind park transformer, and $I_{trwf}$ is the current at the wind park transformer. If the wind park comprises capacitor banks or other reactive power compensation means (such as e.g. inductor banks), and if they are active, they may be taken into account in the compensation factor as well.

In accordance with FIG. 2b, the compensation factor $Q_{com}$ may be added to the central reactive power control demand $Q_{ref}$. The result is a compensated central reactive power control demand $Q^*_{ref}$.

This central reactive power control demand $Q^*_{ref}$ may be input to a despatch function, which determines the amounts of reactive power $Q_{100}$, $Q_{200}$ etc. that may be requested from each of the wind turbine local control systems. In accordance with one embodiment, the central control demand $Q^*_{ref}$ may simply be divided equally among all wind turbines.

In accordance with other embodiments, the central control demand may be divided in such a way that substantially the same percentage of available reactive power is generated at each of the wind turbines. The commands sent to each of the local control systems may be determined for example in accordance with the following equations:

$$Q_{nec} = Q^*_{ref} - \Sigma(1-E_i) \cdot Q_{imax} \quad \text{Eq. 4}$$

$Q^*_{ref}$ is the compensated central reactive power control demand, $E_i$ indicates for each wind turbine whether it is within its operational boundaries or not (E=1 within operational boundaries; E=0 if the wind turbine is at its operational boundaries, the wind turbines thus generating their maximum or minimum possible reactive power), $Q_{imax}$ is the maximum available reactive power for each of the wind turbines and the result $Q_{nec}$ is the amount of reactive power that has to be generated by the wind turbines in central control mode;

$$Q_{max\ total} = \sum_i^N E_i \cdot F_i \cdot Q_{i\ max}, \qquad \text{Eq. 5}$$

wherein $Q_{maxtotal}$ is the maximum available amount of reactive power of the wind turbines that are in central control mode and $F_i$ still indicates for each wind turbine whether a particular wind turbine is operative or not (F=1 if operative and F=0 if not operative); and $$\alpha = \frac{Q_{nec}}{\text{abs}(Q_{max\ total})}, \qquad \text{Eq. 6}$$

wherein α is a factor indicating how much of the available reactive power each of the wind turbines should generate. The central control system may send the factor α to each of the local controls, or may send signals of corresponding amounts to each of the wind turbines.

Apart from the amounts of reactive power to be produced by each of the wind turbines having a local control system, other information may also be sent to each of the local control systems. In some embodiments, the central control system may send dynamic (non-constant) limit values to the local control systems indicating when a local control system is to switch to a local control mode. The local control systems may thus determine themselves to switch to a local control mode and do not need to wait for a particular command to do so. The limit values may be determined substantially such that in normal grid conditions, the wind park operates in the central control mode and that in or near exceptional grid conditions, the wind park operates in the local control mode. In exceptional grid conditions, the local control may thus be able to react quicker in response to locally measured parameters. For example, the limit values sent to the local control systems may be determined in accordance with:

$$\text{Lim sup}_i = (1 + g \cdot 0.01 + \Delta u_{traf} + \Sigma \Delta u_{line} + \Delta u_{trafi} - h_i) \cdot U_{bt}$$

$$\text{Lim min}_i = (1 - g \cdot 0.01 + \Delta u_{traf} + \Sigma \Delta u_{line} + \Delta u_{trafi} + h_i) \cdot U_{bt}, \qquad \text{Eq. 7}$$

wherein g is the previously defined slope prescribed by the TSO, $\Delta u_{traf}$ is the normalized voltage drop for the wind park transformer, $\Sigma \Delta u_{line}$ is the sum of the normalized voltage drops for the electrical connecting lines, $\Delta u_{trafi}$ is the normalized voltage drop for the transformer of the wind turbines i, $U_{bt}$ is the low voltage on the wind park side of the transformer, and $h_i$ is an adjustment parameter for wind turbine i.

In this embodiment, the adjustment parameter h for wind turbine i may be determined in accordance with:

$$u_{pcc} = \Delta u_{traf} + \Sigma \Delta u_{line} + \Delta u_{trafi} + h_i + u_{local}, \qquad \text{Eq. 8}$$

wherein $u_{pcc}$ is the normalized voltage at the PCC and $u_{local}$ is the normalized local voltage at a wind turbine.

The normalized voltage drops for each of the separate components may be calculated in accordance with:

$$\Delta u = I \cdot (R \cdot \cos \phi + X \cdot \sin \phi), \qquad \text{Eq. 9a}$$

Wherein I is the current circulating through a particular part of the wind park (e.g. stretch of cable, or transformer), R is the resistance of the particular part of the wind park, X is the reactance of a particular part of the wind park and φ is the power factor angle.

Alternatively, the normalized voltage drops may be calculated in accordance with:

$$\Delta u = \frac{P \cdot R + Q \cdot X}{U^2}, \qquad \text{Eq. 9b}$$

Wherein e.g. for the wind park transformer:
P is active power of the wind park, Q is reactive power of the wind park, R is resistance of transformer and X is reactance of transformer and U is the nominal voltage at the PCC. The voltage drops for each stretch of electrical line and for each wind turbine transformer may be determined in a similar manner using the appropriate resistance, reactance, active power and reactive power.

In the described manner, maximums and minimums for local voltages may be sent to the local control systems of the wind turbines. When a local voltage for a particular wind turbine reaches or exceeds one of the limit values, this particular wind turbine may switch to a local control mode. It should be noted that other wind turbines may still be in central control mode and may continue receiving and following orders of the central control system. The wind turbines that are in local control mode may deliver predetermined amounts of reactive power, which may e.g. be the maximum or minimum possible reactive power capacity.

Within the scope of the invention, the method of calculating the limit values by the central control system may be varied. For example, in equation 7, the factor 1+0.01 g may be limited to a maximum of 1.05, and the factor 1−0.01 g may be limited to a minimum of 0.95. Other variations are also possible. Also, in some embodiments of the invention, the local limit values may be calculated by the local control systems. In other embodiments, the local limit values may be constant and may be determined e.g. during a trial or test phase of a wind park.

In further embodiments of the invention, a high rate of change of a local voltage may prompt a local control system to switch from a central control mode to a local control mode. In another example, a sudden change in voltage of certain proportions (e.g. a predetermined voltage difference is achieved in a very small time period) may prompt such a switch. The limit rates of change and/or the limit proportions of sudden changes may be determined by the local control system itself, they may be delivered by the central reactive power control system or may be constant.

Figure 3A:
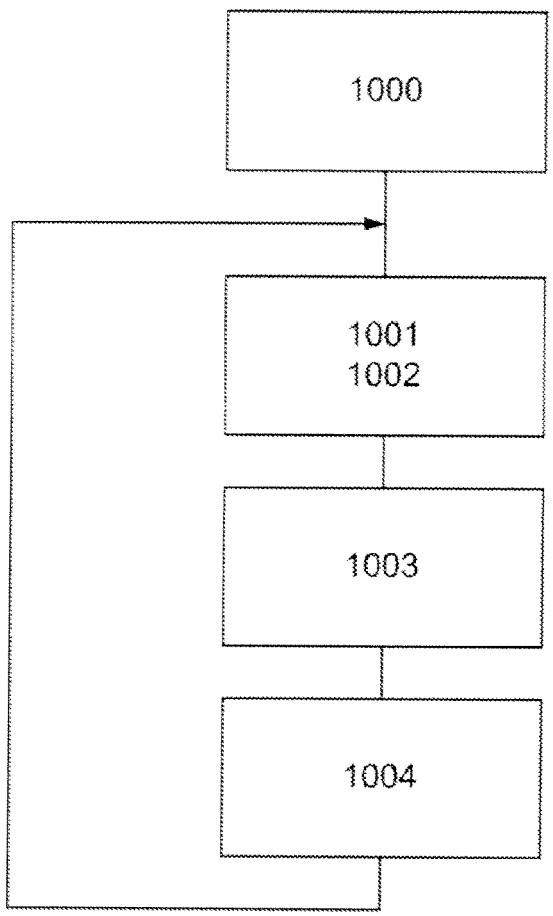
FIGS. 3a and 3b illustrate embodiments of control methods in accordance with the present invention in a central control system and a local control system respectively.

FIG. 3a illustrates a control method in a central control mode according to an embodiment of the present invention. In step 1000, the central control method is started and initial values of parameters are determined (e.g. reactance for the wind park components). Steps 1001-1002 comprise the collection of data from respectively the PCC, and the local control systems. Data that may be collected from the PCC may include (but is not limited to) the voltage at the PCC, current at the PCC, grid frequency, active power generated by the wind park and reactive power generated by the wind park.

Data that may be collected from one or more of the wind turbines in the park may include (but is not limited to) active power generated, reactive power generated, the status of the wind turbine (operating or not; within operational boundaries or not; in local control mode or in central control mode), the maximum available reactive power capacity (capacitive), the minimum reactive power capacity (inductive), local voltage, current and frequency.

The maximum and minimum available reactive power may vary with varying local voltage. The values for the maximum and minimum available reactive power may be calculated by the local control systems and sent to the central reactive power control system.

Step 1003 comprises the calculation of the central reactive power control command, and the calculation of the instructions to be sent to the local control systems. This calculation may be e.g. in accordance with Equations 1 and 2. If the grid voltage is outside predefined boundaries (see e.g. FIG. 2a), the central reactive power control command may be the maximum or minimum available reactive power for the wind park.

The instructions sent to a local control system may include, but are not limited to: local reactive power commands (which may in some embodiments be calculated in accordance with equations 3-6), local limit values (which may in some embodiments be calculated in accordance with equations 7-9), and local limit rates.

Step 1004 comprises sending the commands indicative of the reactive power to be generated locally to the local control systems. The implementation of the commands by the local control systems and varying grid conditions may lead to new values for one or more variables, so that the steps 1001, 1002 and 1003 may be repeated continuously.

Figure 3B:
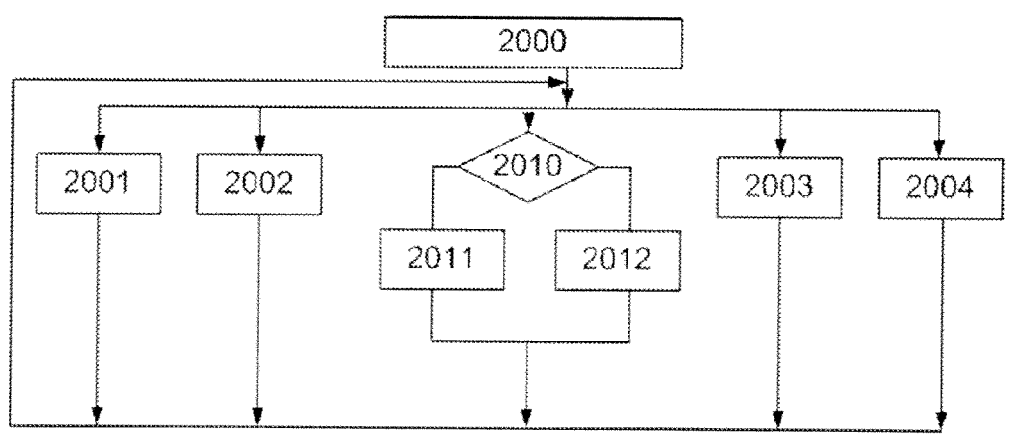

FIG. 3b illustrates a control method in a local control system according to some embodiments of the present invention. In a method step 2000, the control method is started. In a step 2001, certain variables may be measured such as e.g. local voltage, current, active and reactive power. In a step 2002, the values of these variables may be sent to a central control system. Other parameters/variables that may be sent to a central control system may include e.g. the status of the wind turbine (operative or not), the operation status of the wind turbine (within operational boundaries or not), the control mode (central control mode or local control mode).

In a step 2003, control signals for e.g. the converter may be calculated and in a step 2004, these control signals may be sent to the converter. As may be seen in FIG. 3b, the separate method steps are not necessarily sequential, but rather take place continuously and simultaneously. They may each have So their own operational speeds and frequencies: in some embodiments, measuring certain variables may take place e.g. every 0.01 s, whereas sending data to the central control system may take place e.g. every 0.3 s.

Step 2010 comprises receiving local limit values from the central control system and comparing them with instantaneous local variables. The comparison may lead to a determination of "within limits" in step 2011, or "outside limits" in step 2012. If the determination "outside limits" is made, the local control system will switch to a local control mode.

Once the local reactive power control system has switched to local control mode, the local control system will determine the amount of reactive power to be generated (regardless of commands received from a central control system). In some embodiments, the local control systems may switch back to a central control mode after a predetermined amount of time. The amount of time before returning to a central control mode may be determined in accordance with e.g. the slope of the voltage—reactive power line prescribed by a TSO. The amount of time before returning to the central control mode may be constant, may be calculated by the central control system, or may be calculated by a local control system. The amount of time before returning to the central control mode may in certain embodiments also depend on e.g. the cause of the switch from the central control mode to the local control mode (e.g. voltage value outside limits, rate of change of voltage outside limits, or sudden change in voltage outside limit proportions). When switching back to a central control mode, if the determination "outside limits" is made again, the local control mode will be resumed.

In other embodiments, the local control will switch back to a central control mode when one or more measured variables fulfil a predefined requirement. Also combinations of a time-dependent and variable-dependent return to a central control mode may be used.

The reactive power control method for the wind park may further be adapted to include algorithms for taking certain wind turbines out of operation if e.g. the wind turbine does not follow the commands of the central control system or e.g. if a particular wind turbine keeps working in (or switching to) local control mode, or if the wind park is unable to deliver the prescribed reactive power values, or e.g. if communication failures are noted etc.

Furthermore, in embodiments of the invention, wind turbines within the same wind park may comprise different local reactive power control systems. For example, some local reactive power control systems may be adapted to switch to a local control mode only in response to an instantaneous voltage, whereas other local reactive power control systems switch only in response to (or also in response to) a rate of change of a voltage, yet further reactive local power control systems may be adapted to switch only in response to (or also in response to) voltage jumps of specified proportions.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described before, but should be determined only by a fair reading of the claims that follow.

The invention claimed is:

1. A method of reactive power regulation in a wind park connected to an electrical grid:
   the wind park comprising a plurality of wind turbines and a central reactive power control system, wherein at least a first portion of the plurality of wind turbines each comprise a local reactive power control system adapted to work in a central control mode and a local control mode, wherein
   the central reactive power control system sends commands indicative of local reactive power demands to the local reactive power control systems in accordance with at least one measured variable of the grid, and wherein
   in a central control mode, the local reactive power control system operates the wind turbine to generate reactive power in accordance with the commands received from the central reactive power control system, and wherein
   in a local control mode, the local reactive power control system determines an amount of reactive power to be generated and controls the wind turbine to generate said amount of reactive power regardless of the commands received from the central reactive power control system.

2. A method according to claim 1, wherein the local reactive power control system switches from the central control mode to the local control mode when a measured local variable passes a local limit value for the wind turbine.

3. A method according to claim 2, wherein the local reactive power control system switches from the central control mode to a local control mode when a measured local variable passes a local limit value for the wind turbine during at least a predetermined period of time.

4. A method according to claim 2, wherein said local limit value for the wind turbine is such that in normal grid conditions, the local reactive control system operates in the central control mode and that in or near exceptional grid conditions, the local reactive control system operates in the local control mode.

5. A method according to claim 2, wherein the local limit value for each wind turbine is a voltage and the measured local variable is a local voltage.

6. A method according to claim 5, wherein the local limit value for each wind turbine comprise a minimum and a maximum voltage.

7. A method according to claim 2, wherein the local limit value is a constant.

8. A method according to claim 2, wherein the local limit value is determined in accordance with at least one measured variable.

9. A method according to claim 1, wherein in the local control mode, the amount of reactive power to be generated is the maximum or minimum amount of reactive power the wind turbine can generate.

10. A method according to claim 9, wherein said maximum and minimum amount of reactive power the wind turbine can generate is determined in accordance with operational conditions of the wind park and/or the wind turbine.

11. A method according to claim 1, wherein the local reactive power control system switches from the central control mode to the local control mode when an absolute value of a rate of change of a measured local variable surpasses a local limit rate.

12. A method according to claim 1, wherein the local reactive power control system switches from the central control mode to the local control mode when a sudden change of a measured local variable surpasses local limit proportions.

13. A method according to claim 11, wherein the measured local variable is a local voltage.

14. A method according to claim 2, wherein the local limit value and/or local limit rates and/or local limit proportions are determined by the central reactive power control system and supplied to each of the local reactive power control systems.

15. A method according to claim 2, wherein the local limit value and/or local limit rates and/or local limit proportions are determined by each of the local reactive power control systems.

16. A method according to claim 1, wherein the local reactive power control systems switch from the local control mode to the central control mode after a predetermined amount of time of operating in the local control mode has passed.

17. A method according to claim 1, wherein the local reactive power control system switches from the local control mode to the central control mode in accordance with operational conditions of the wind park and/or electrical grid and/or other wind turbines.

18. A method of reactive power regulation implemented in a local reactive power control system of a wind turbine comprising:
   receiving commands indicative of a local reactive power demand from a wind park central reactive power control system,
   obtaining a maximum and a minimum local voltage,
   obtaining an instantaneous value of the local voltage from a measuring device and comparing said instantaneous value for the local voltage with the maximum and minimum local voltage, and
   sending control commands to at least one wind turbine component for generating the maximum available inductive reactive power if the local voltage is more than the maximum voltage, and
   sending control commands to at least one wind turbine component for generating the maximum available capacitive power if the local voltage is less than the minimum local voltage.

19. A method according to claim 18, further comprising obtaining an absolute rate of change limit of a local voltage,
   determining a rate of change of a local voltage based on the obtained values of the local voltage from the measuring device, and
   locally determining the amount of reactive power to be generated, and sending control commands to at least one wind turbine component for generating said amount of reactive power, if an absolute determined voltage rate of change is more than an absolute rate of change limit.

20. A method according to claim 19, further comprising sending control commands to at least one wind turbine component for generating reactive power in accordance with the commands received from the central reactive power control system if the absolute determined voltage rate of change is less than the absolute rate of change limit and the local voltage is between the maximum and the minimum local voltage.

21. A method according to claim 18, wherein obtaining the maximum and a minimum local voltage comprises receiving the maximum and minimum local voltage from the central reactive power control system.

22. A method according to claim 18, wherein obtaining the maximum and a minimum local voltage comprises calculating the maximum and minimum local voltage.

23. A method according to claim 18, further comprising obtaining an absolute rate of change limit of a local voltage including receiving the absolute rate of change limit from the central reactive power control system.

24. A method according to claim 19, wherein obtaining an absolute rate of change limit of a local voltage comprises calculating the absolute rate of change limit.

25. A non-transitory computer readable medium storing program instructions for causing a computing system of a wind turbine local reactive power control system to perform a method according to claim 18.

26. A wind park connected to an electrical grid and comprising a plurality of wind turbines, wherein
   at least a portion of the plurality of wind turbines each comprises a local reactive power control system capable of controlling the reactive power the wind turbine generates, the wind park further comprising:
   a central reactive power control system capable of determining commands indicative of local reactive power demands for each of the local reactive power control systems in response to at least one measured variable of the grid, and sending the commands to the local reactive power control systems, and
   the local reactive power control systems being adapted to work in a central control mode and a local control mode, wherein
   in a central control mode, the local reactive power control system controls the corresponding wind turbine to generate reactive power in accordance with a command received from the central reactive power control system, and wherein
   in a local control mode, the local reactive power control system determines an amount of reactive power to be generated by the corresponding wind turbine and controls the wind turbine to generate said amount of reactive power.

27. A wind park according to claim 26, wherein the local reactive power control systems are capable of switching between the central control mode and the local control mode in response to at least one measured variable.

28. A wind park according to claim 26, wherein the central control system can determine a reactive power demand for the wind park based on a measured grid voltage.

29. A wind park according to claim 26, wherein the local reactive power controls are adapted to control a converter and/or a pitch system.

\* \* \* \* \*